US006336386B1

(12) United States Patent
Lee

(10) Patent No.: US 6,336,386 B1
(45) Date of Patent: Jan. 8, 2002

(54) PLIER DEVICE HAVING AN ADJUSTABLE OPENING

(76) Inventor: Yung Jen Lee, P.O. Box 63-99, Taichung (TW), 406

( * ) Notice: Subject to any disclaimer, the term of this patent is extended or adjusted under 35 U.S.C. 154(b) by 0 days.

(21) Appl. No.: 09/620,754

(22) Filed: Jul. 21, 2000

(51) Int. Cl.[7] .................................................. B23B 7/14
(52) U.S. Cl. ............................. 81/328; 81/314; 81/423; 269/6
(58) Field of Search ........................... 81/314, 319–325, 81/328, 338, 340, 392, 419, 421–424; 269/6

(56) References Cited

U.S. PATENT DOCUMENTS 2,249,661 A * 7/1941 Littlefield .................... 81/328
3,470,872 A * 10/1969 Grieshaber .................. 600/217
3,779,108 A 12/1973 Reiter .......................... 81/424
4,896,661 A * 1/1990 Bogert et al. ................. 606/86
5,791,210 A * 8/1998 Wolff et al. .................... 81/302
6,213,140 B1 * 4/2001 Ploeger .......................... 137/1
6,240,815 B1 * 6/2001 Huang .......................... 81/328

* cited by examiner

*Primary Examiner*—Joseph J. Hail, III
*Assistant Examiner*—David B. Thomas

(57) ABSTRACT

A plier device includes two longitudinal elements pivotally secured together with a middle pivot shaft, and each having a handle member and a jaw member. A ratchet device is disposed in one of the longitudinal elements. A follower is rotatably disposed in the other longitudinal element and has a pawl detachably and adjustably actuated to engage with the ratchet device for adjusting the opening size of the jaw members. A knob is slidably engaged on the other longitudinal element and has an actuator engaged with the follower to force the pawl to engage with the ratchet device.

9 Claims, 4 Drawing Sheets

PLIER DEVICE HAVING AN ADJUSTABLE OPENING

BACKGROUND OF THE INVENTION

1. Field of the Invention

The present invention relates to a plier device, and more particularly to a plier device having an adjustable opening for adjusting to different opening sizes and for operating or actuating the fasteners or the work pieces of different sizes.

2. Description of the Prior Art U.S. Pat. No. 3,779,108 to Reiter discloses a typical plier devices comprising a pair of handles pivotally secured together and each having a jaw member extended from one end thereof. The opening size of the handles of the typical plier devices is predetermined and may not be changed for actuating or for operating the objects or the work pieces of different sizes.

The present invention has arisen to mitigate and/or obviate the afore-described disadvantages of the conventional plier devices.

SUMMARY OF THE INVENTION

The primary objective of the present invention is to provide a plier device includes an adjustable opening for adjusting to different opening sizes and for facilitating the operating or actuating the fasteners or the work pieces of different sizes.

In accordance with one aspect of the invention, there is provided a plier device comprising a first and a second longitudinal elements including a middle portion pivotally secured together with a pivot shaft, and each including a first end having a handle member provided thereon and each including a second end having a jaw member provided thereon, the handle members being movable toward and away from each other, and the jaw members being movable toward and away from each other, and setting means for adjustably setting an opening size between the jaw members of the first and the second longitudinal elements.

The setting means includes a ratchet device disposed in the first longitudinal element, a pawl disposed in the second longitudinal element, and means for detachably actuating the pawl to engage with the ratchet device. The setting means includes a follower rotatably secured in the second longitudinal element by a pivot pin and having the pawl provided thereon, and actuating means for selectively forcing the pawl to engage with the ratchet device.

The follower includes a lock notch formed therein for rotatably receiving the pivot pin and for rotatably securing the follower in the second longitudinal element. The second longitudinal element includes a channel formed therein for receiving the follower. The actuating means includes a knob slidably engaged on the second longitudinal element, the knob includes an actuator engaged with the follower to force the pawl to engage with the ratchet device.

The follower includes a recess formed therein and defined by a first end and a second end thereof, the actuator of the knob is slidably received in the recess of the knob and forced to engage with the first end and the second end of the follower for forcing the pawl toward and away from the ratchet device.

A guiding device is further provided for guiding the knob to slide relative to the second longitudinal element and includes at least one groove formed in the second longitudinal element, and at least one guide extended from the knob and slidably received in the groove of the second longitudinal element.

A positioning device is further provided for positioning the knob to the second longitudinal element, and includes at least one orifice formed in the second longitudinal element, and a latch extended from the knob and engaged in the orifice of the second longitudinal element.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figures 1, 2:
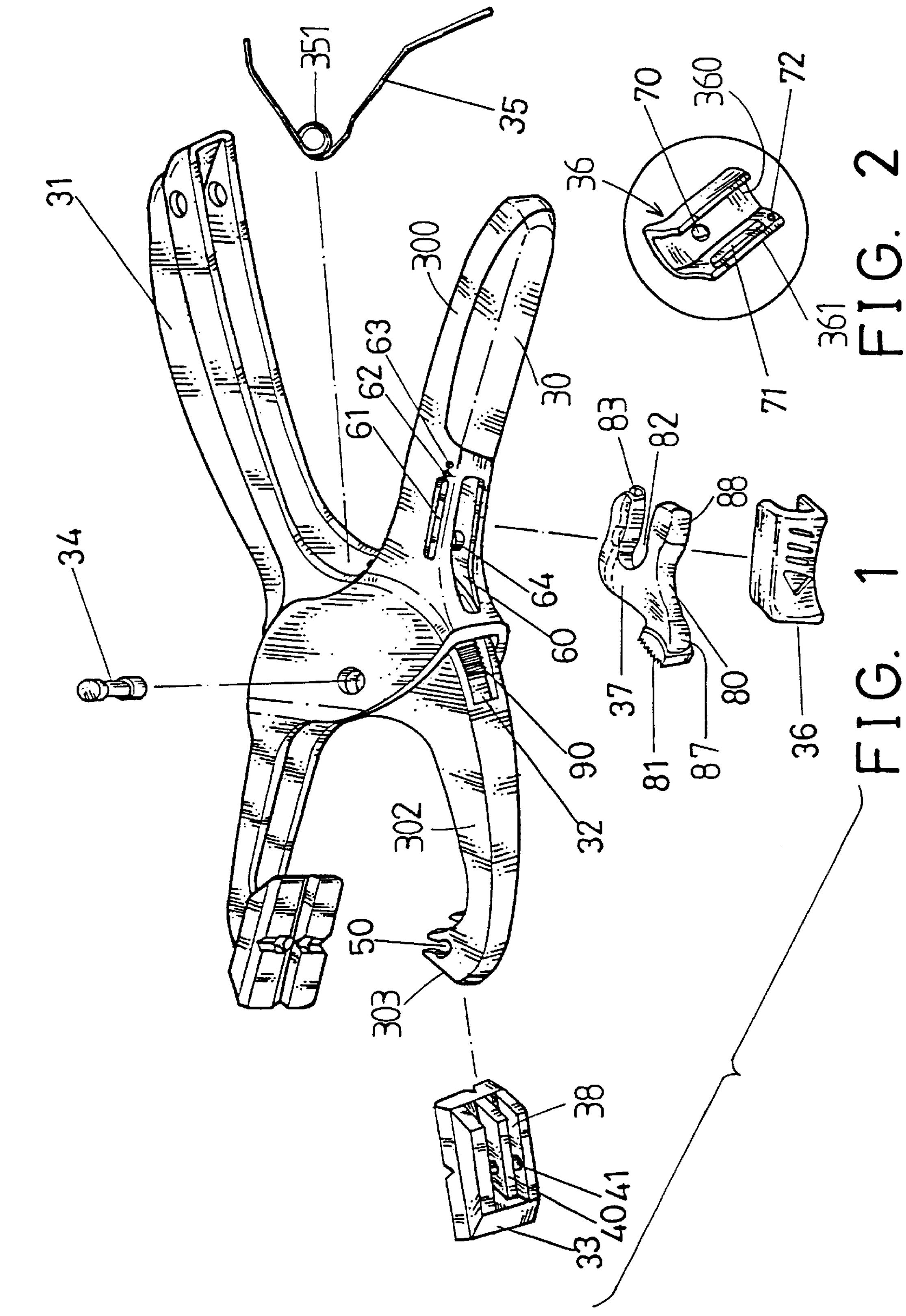
FIG. 1 is a partial exploded view of a plier device in accordance with the present invention.
FIG. 2 is a perspective view of an actuating knob of the plier device.
Figure 3:
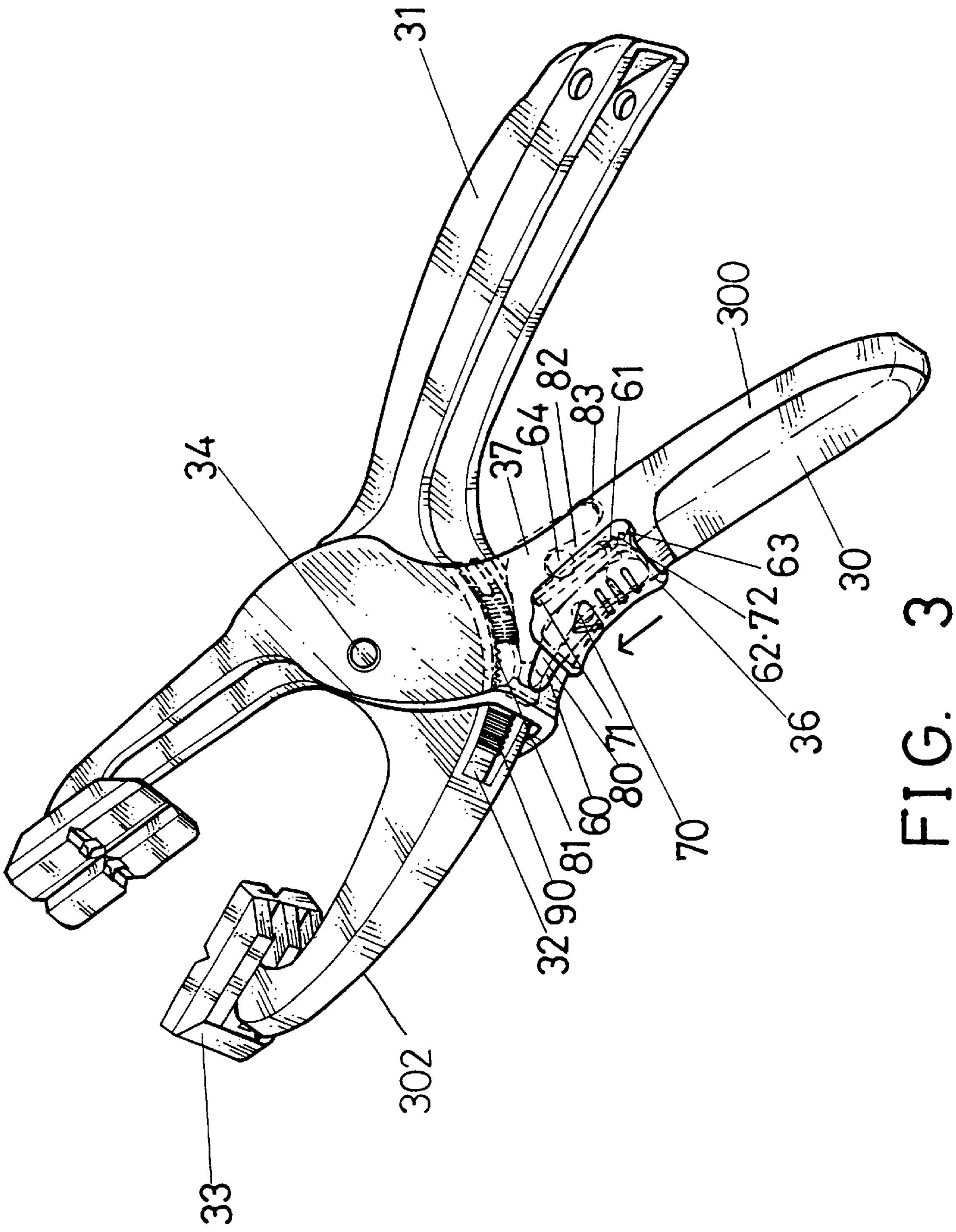
FIGS. 3 and 4 are perspective views illustrating the operation of the plier device.

Referring to the drawings, and initially to FIGS. 1–3, a plier device in accordance with the present invention comprises a pair of longitudinal elements 30, 31 disposed in the usual criss-cross relation and including a middle portion pivotally or rotatably secured together with a pivot shaft 34, and each including a handle member 300 formed and provided on one end thereof and each including a jaw member 302 formed and provided on the other end thereof. A spring 35 includes a middle portion having a ring 351 provided therein and engaged on the pivot shaft 34 for securing the spring 35 to the plier device. The spring 35 is engaged with the handle members 300 of the longitudinal elements 30, 31 for biasing the handle members 300 away from each other and thus for biasing the jaw members 302 toward each other. A pair of shoes 33 each includes a pair of slots 38 formed therein or each includes a flap 40 formed therein for defining or forming the slots 38 therein. An axle 41 is provided in each of the shoes 33 and extends through the slots 38 of the shoes 33. The jaw members 302 of the longitudinal elements 30, 31 each includes a free end having a pair of flaps 303 formed therein and engaged into the slots 38 of the shoes 33 respectively. The flaps 303 of the jaw members 302 each includes a lock notch 50 formed therein for receiving the axle 41 of the shoes 33 and for pivotally or rotatably securing the shoes 33 to the free ends of the jaw members 302 respectively.

The jaw member 302 of the longitudinal element 31 includes a ratchet device 32 received and engaged therein and having a number of ratchet teeth 90 formed thereon. The ratchet teeth 90 are preferably facing toward the middle portion or the handle member 300 of the other longitudinal element 30. The handle member 300 of the other longitudinal element 30 includes a channel 60 formed therein, particularly formed in the middle and outer peripheral portion thereof, and includes one or both sides each having a groove 61 and one or more orifices 62, 63 formed therein, and each includes a pin 64 provided and extended in the channel 60 thereof. An actuating knob 36 includes a U-shaped cross section having an actuator 70 extended from a middle plate 360 thereof, and having a pair of side plates 361 extended or dependent from the middle plate 360 thereof. The side plates 361 both or each includes a guide 71 and a latch 72 extended inward of the knob 36 and slidably received in the groove(s) 61 and engaged in the respective orifice(s) 62, 63 of the handle member 300 of the longitudinal element 30.

Figure 5:
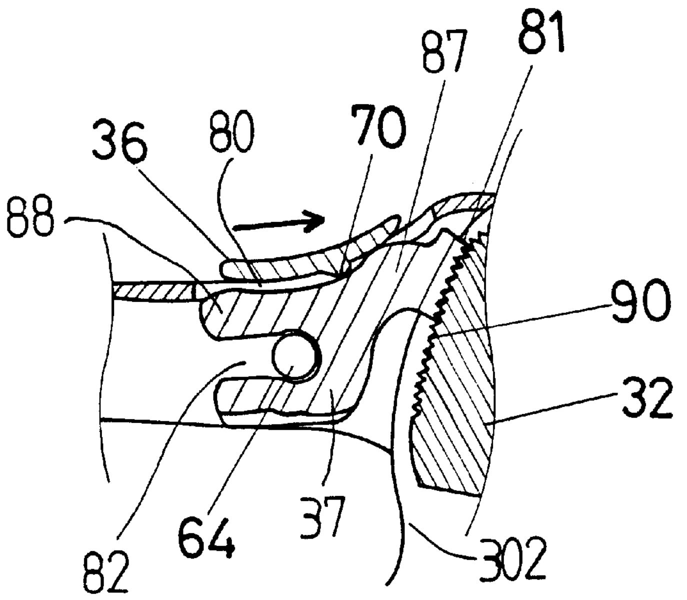
FIGS. 5 and 6 are partial cross sectional views illustrating the operation of the plier device.
Figure 6:
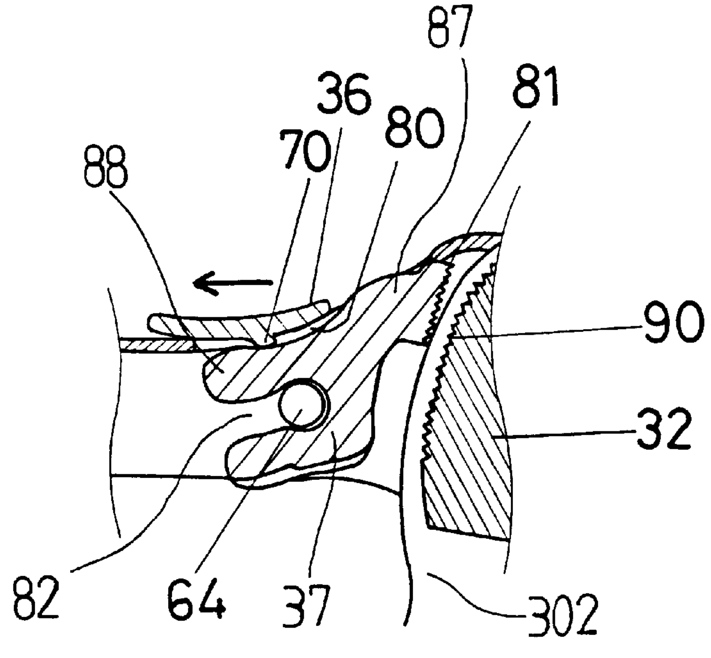

A follower 37 is slidably and/or rotatably and/or pivotally received in the channel 60 of the handle member 300 of the longitudinal element 30 and includes a lock notch 82 formed therein for receiving the pin 64 and for rotatably or pivotally secured in the channel 60 of the handle member 300 of the longitudinal element 30. The lock notch 82 has a circular inner portion for rotatably receiving the pin 64 and for rotatably securing the follower 37 in the channel 60 of the handle member 300 of the longitudinal element 30. The follower 37 includes a pawl 81 provided on one end 87 thereof for engaging with the ratchet teeth 90 of the ratchet device 32 when the follower 37 is forced to rotate about the pivot pin 64. The follower 37 includes a recess 80 formed in the outer portion thereof and facing outward of the handle members 300 and defined or formed between the ends 87, 88 thereof (FIGS. 5, 6). The follower 37 may further include a depression 83 formed therein, and the handle member 300 may include a stop engaged with the depression 83 of the follower 37 for limiting the follower 37 to rotate relative to the handle member 300 and for preventing the follower 37 from being disengaged from the handle member 300.

In operation, as shown in FIGS. 3–6, the actuator 70 of the knob 36 is received in the recess 80 of the follower 37 and may be forced to engage with either of the ends 87, 88 of the follower 37 by moving the knob 36 forward and rearward along the handle portion 300 of the longitudinal element 30. As shown in FIGS. 3 and 5, when the jaw members 302 or the handle members 300 are moved away from each other to the required opening size, the front or the first end 87 of the follower 37 is forced toward the ratchet device 32 to force and to engage the pawl 81 with the teeth 90 of the ratchet device 32, such that the opening size of the jaw members 302 or of the handle members 300 may be set and determined. When the plier device is used for operating the fasteners or the like of a relatively smaller size and when the jaw members 302 or the handle members 300 are not required to be moved far away from each other, the adjustment of the opening size of the plier device to the relatively smaller size may facilitate the operation of the plier device.

Figure 4:
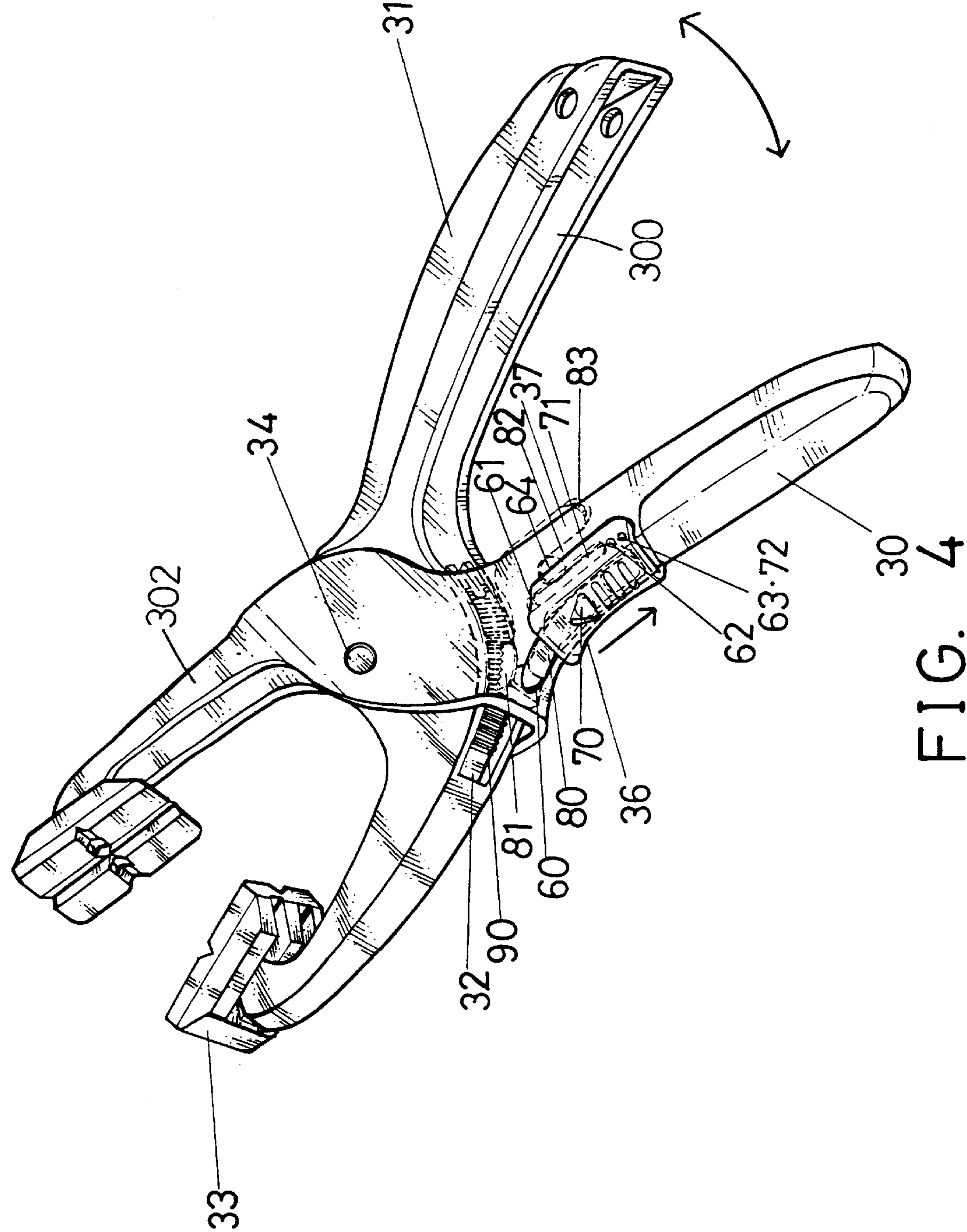

When it is required to change the opening size of the jaw members 302 or the handle members 300, as shown in FIGS. 4 and 6, the knob 36 is moved away from the ratchet device 32, and the actuator 70 may be forced and pushed against the rear end or the other end 88 of the follower 37 to rotate the follower 37 and to disengage the pawl 81 from the ratchet device 32. When the pawl 81 is disengaged from the ratchet device 32, the jaw members 302 or the handle members 300 may be freely moved toward each other or moved away from each other to the required opening size. When the jaw members 302 or the handle members 300 are moved relative to each other to the required opening size, the front or the first end 87 of the follower 37 may then be forced toward the ratchet device 32 to force the pawl 81 to engage with the teeth 90 of the ratchet device 32 again, such that the opening size of the jaw members 302 or of the handle members 300 may be adjusted and determined. The latch 72 of the knob 36 may be engaged with either of the orifice(s) 62, 63 of the handle member 300 of the longitudinal element 30 for positioning the knob 36 to the handle member 300 at the required position.

Accordingly, the plier device in accordance with the present invention includes an adjustable opening for adjusting to different opening sizes and for facilitating the operating or actuating the fasteners or the work pieces of different sizes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A plier device comprising:

a first and a second longitudinal elements including a middle portion pivotally secured together with a pivot shaft, and each including a first end having a handle member provided thereon and each including a second end having a jaw member provided thereon, said handle members being movable toward and away from each other, and said jaw members being movable toward and away from each other, and setting means for adjustably setting an opening size between said jaw members of said first and said second longitudinal elements, said setting means including a ratchet device disposed in said first longitudinal element, a pawl disposed in said second longitudinal element, and said setting means including a follower rotatably secured in said second longitudinal element by a pivot pin and having said pawl provided thereon, and actuating means for selectively forcing said pawl to engage with said ratchet device.

2. The plier device according to claim 1, wherein said follower includes a lock notch formed therein for rotatably receiving said pivot pin and for rotatably securing said follower in said second longitudinal element.

3. The plier device according to claim 1, wherein said second longitudinal element includes a channel formed therein for receiving said follower.

4. The plier device according to claim 1, wherein said actuating means includes a knob slidably engaged on said second longitudinal element, said knob includes an actuator engaged with said follower to force said pawl to engage with said ratchet device.

5. The plier device according to claim 4, wherein said follower includes a recess formed therein and defined by a first end and a second end thereof, said actuator of said knob is slidably received in said recess of said knob and forced to engage with said first end and said second end of said follower for forcing said pawl toward and away from said ratchet device.

6. The plier device according to claim 4, further comprising guiding means for guiding said knob to slide relative to said second longitudinal element.

7. The plier device according to claim 6, wherein said guiding means includes at least one groove formed in said second longitudinal element, and at least one guide extended from said knob and slidably received in said at least one groove of said second longitudinal element.

8. The plier device according to claim 4 further comprising positioning means for positioning said knob to said second longitudinal element.

9. The plier device according to claim 8, wherein said positioning means includes at least one orifice formed in said second longitudinal element, and a latch extended from said knob and engaged in said at least one orifice of said second longitudinal element.

* * * * *